Nov. 24, 1959 C. E. LOMAX 2,914,616

RESTRICTED SERVICE ARRANGEMENTS IN TELEPHONE SYSTEMS

Filed June 30, 1955 5 Sheets-Sheet 1

INVENTOR.
CLARENCE E. LOMAX
BY Mc Walter Owen.
ATTY.

Nov. 24, 1959 C. E. LOMAX 2,914,616

RESTRICTED SERVICE ARRANGEMENTS IN TELEPHONE SYSTEMS

Filed June 30, 1955 5 Sheets-Sheet 2

*INVENTOR.*
CLARENCE E. LOMAX

*BY* [signature]

ATTY.

REPEATER 300

INVENTOR.
CLARENCE E. LOMAX
BY Wm. Walter Owen.
ATTY.

SPEC. 2ND SELECTOR 400

INVENTOR.
CLARENCE E. LOMAX
BY [signature]
ATTY.

Nov. 24, 1959 C. E. LOMAX 2,914,616

RESTRICTED SERVICE ARRANGEMENTS IN TELEPHONE SYSTEMS

Filed June 30, 1955 5 Sheets-Sheet 5

INVENTOR.
CLARENCE E. LOMAX
BY [signature]
ATTY.

2,914,616

RESTRICTED SERVICE ARRANGEMENTS IN TELEPHONE SYSTEMS

Clarence E. Lomax, Chicago, Ill., assignor to General Telephone Laboratories, Incorporated, a corporation of Delaware Application June 30, 1955, Serial No. 519,083

7 Claims. (Cl. 179—18)

The present invention relates to general to telephone systems, and more particularly to improvements in restricted service arrangements in such systems.

An object of the invention is to provide means for placing restrictions on certain calls on a station basis without interfering with the proper transmission of dial pulses.

Another object of the invention resides in the provision of means whereby substations of a plurality of classes are given access to a nearby exchange, but whereby certain tandem calls through this exchange when attempted by substations of one of these classes are subject to restrictions.

Another object is the provision of novel and improved means in a numerical switch for denying certain calling subscribers access to a predetermined traffic direction on a station basis and/or for granting these subscribers access to a predetermined traffic direction, e.g. an operator's trunk but in the case of a call from subscribers, simultaneously forwarding a discriminating signal, such as a toll denial tone, over this trunk.

According to a feature of the invention substations of a certain class are provided with a special calling device having an auxiliary, cam-operated contact for momentarily grounding the line conductors near the end of the return movement of the device, a differential relay in a numerical switch responding to the ground pulse and the operation or non-operation of this relay determining whether or not restrictions are to be imposed on calls made from the last-mentioned substations in a certain traffic direction.

The invention both as to its organization and method of operation, together with other objects and features thereof, will best be understood by reference to the following specification taken in connection with the accompanying drawings.

In the drawings:

Figs. 1 and 2, with Fig. 2 placed to the right of Fig. 1 illustrate the trunking diagram of a telephone system including the features of the present invention. More particularly;

Fig. 1 diagrammatically shows the switching equipment of a first exchange A, and a restricted substation T1 and a non-restricted substation T2 connected thereto.

Figure 1:
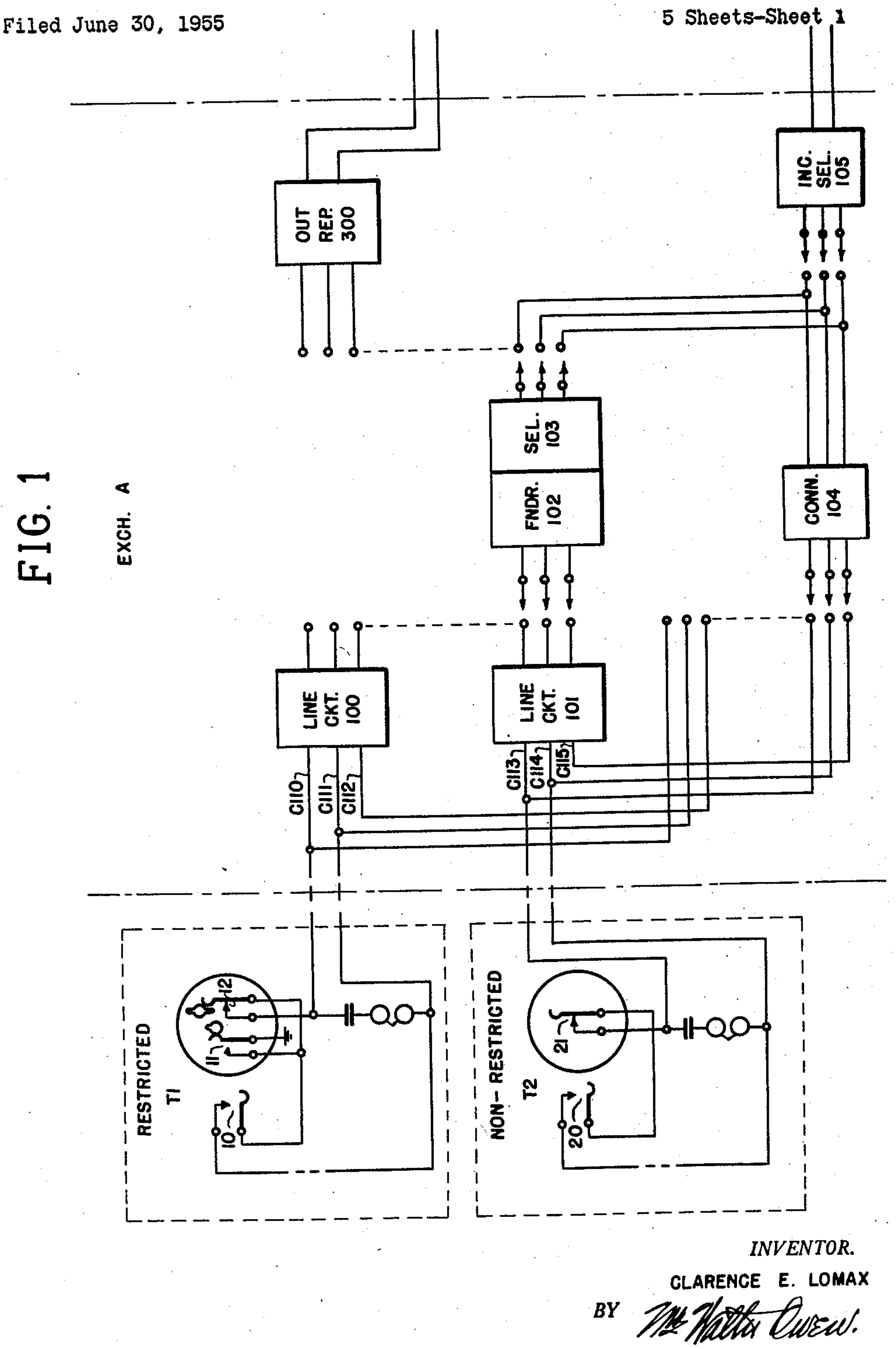

Referring now more particularly to Fig. 1, the exchange A has line circuits 100 and 101 of conventional design. The finder 102, selector 103, the connector 104 and the incoming selector 105 also may be of any well-known type, for example, the Strowger type. In connection with these well-known components, reference is made for example, to my United States Patent 2,214,908. The circuit details of repeater 300 will be more fully disclosed with reference to Fig. 3 in the ensuing description. A pair of substations T1 and T2 are shown, connected by way of the associated subscriber lines to line circuits 100 and 101 respectively. Substation T2 is of conventional design and has a switch hook contact 20 and a dial with the impulse springs 21. Substation T1 also is of generally conventional design except that it uses a special type of dial which during its return movement and non-coincidentally with the opening of the impulse springs, for example, only subsequent to the transmission of the last impulse of a series but prior to its return to normal position, momentarily places ground on the subscriber's line. In Fig. 1, the numeral 12 designates the impulse springs, and numeral 11 the special contact springs of substation T1 through which ground is thus connected to the line. In conjunction with this special type of dial, reference is made for instance, to United States Patent 2,366,647 issued to John E. Ostline, January 2, 1945. In said Ostline patent, a ground pulse is transmitted alternately between certain digital impulses of a series. From the description presented in this patent, it becomes evident that the special dial could be modified to send a ground pulse at the end of the series of digital impulses but before the return of the finger wheel. This is accomplished by placing one projection 45 on the cam 41 at a location on the periphery thereof to provide this modification. The switch hook contact of substation T1 is designated as 10.

Exchange B, (Fig. 2) includes line circuit 203, line finder 204, selector 207, connector 211 and incoming selector 206; all of these circuits, too, may be of well-known design, reference again being made to my above prior patent. The subscriber's line associated with line circuit 203 is assumed to be a party line having a restricted substation T3 and a non-restricted substation T4 connected thereto. Substation T3 may be like substation T1, Fig. 1, and substation T4 like substation T2, Fig. 1. Line circuit 210 terminates a trunk connecting the private automatic branch exchange shown at the top of Fig. 2 with exchange B. The only components of this P.A.B.X shown in Fig. 2 for purposes of illustration are a line switch 201 associated with P.A.B.X substation T5, selector 202 and outgoing repeater 200. These switching components may be similar to those shown in Fig. 2 of my copending application Serial No. 215,561, filed March 14, 1951, now Patent No. 2,733,295, issued January 31, 1956. The same reference numerals have been used herein for corresponding parts.

Figure 2:
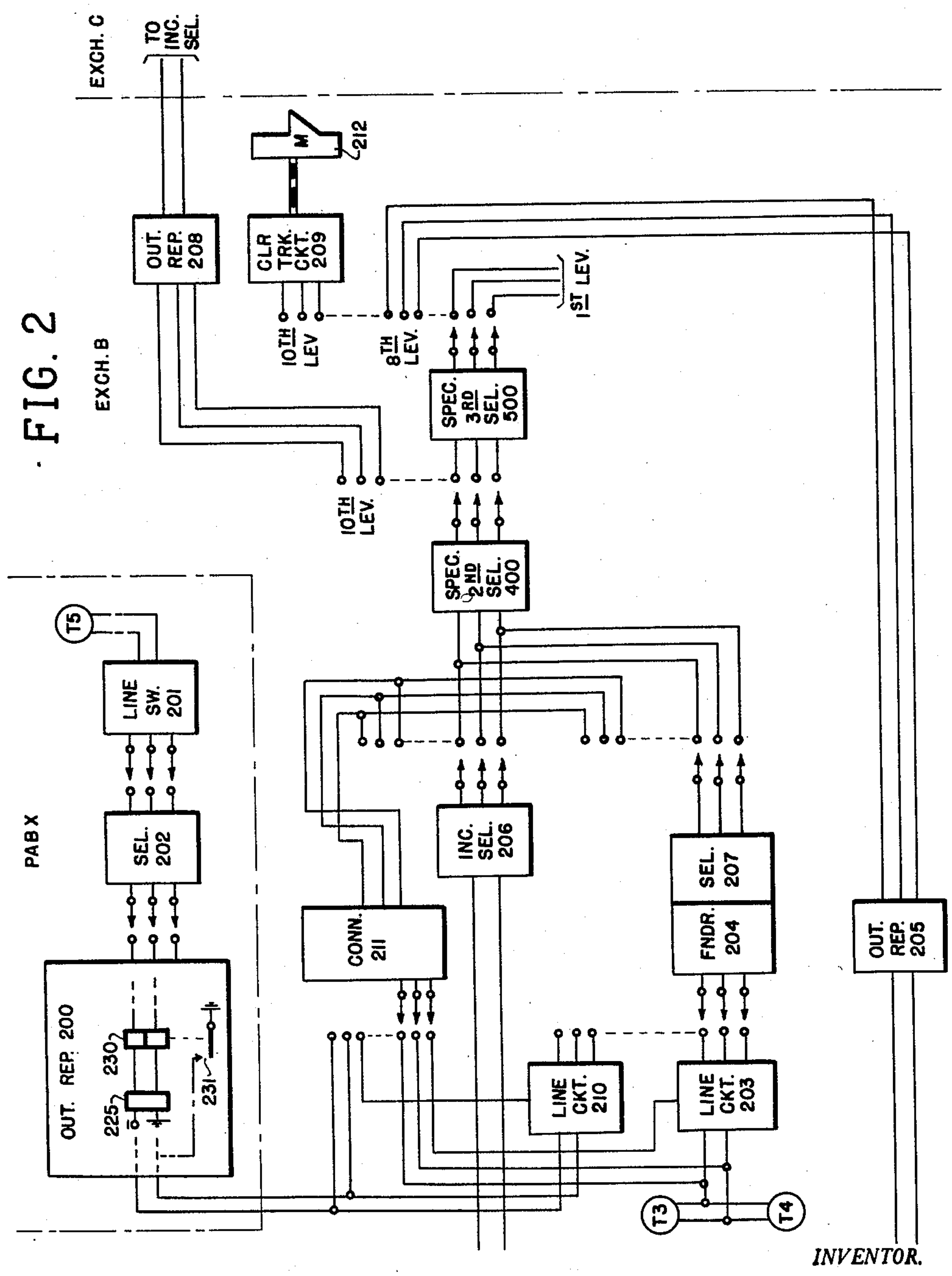
Fig. 2 shows in diagrammatic form, parts of the switching equipment in a second exchange B and in a private automatic branch having access thereto. It also shows two party line substations T3 and T4 connected to exchange B and indicates a trunk from B to an exchange C.
Figure 4:
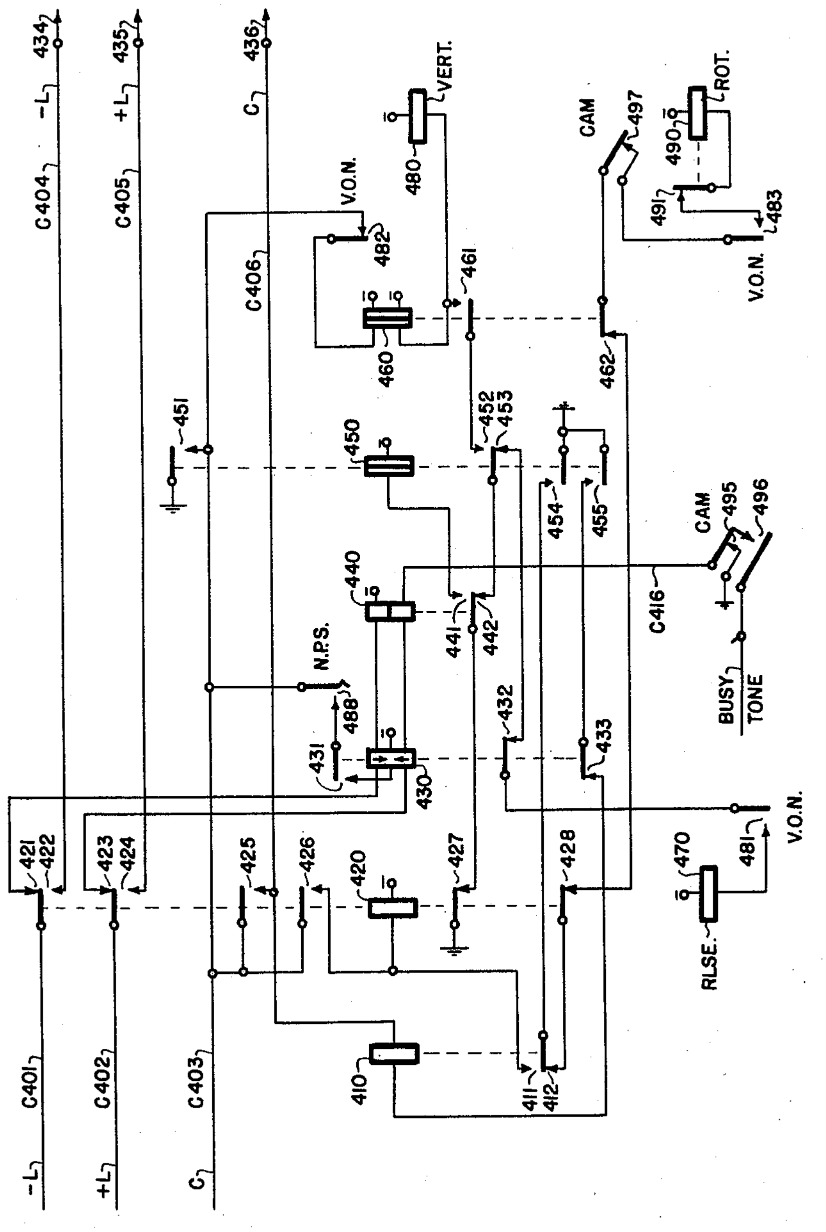
Fig. 4 shows a special second selector circuit arranged for restricted service.
Figure 5:
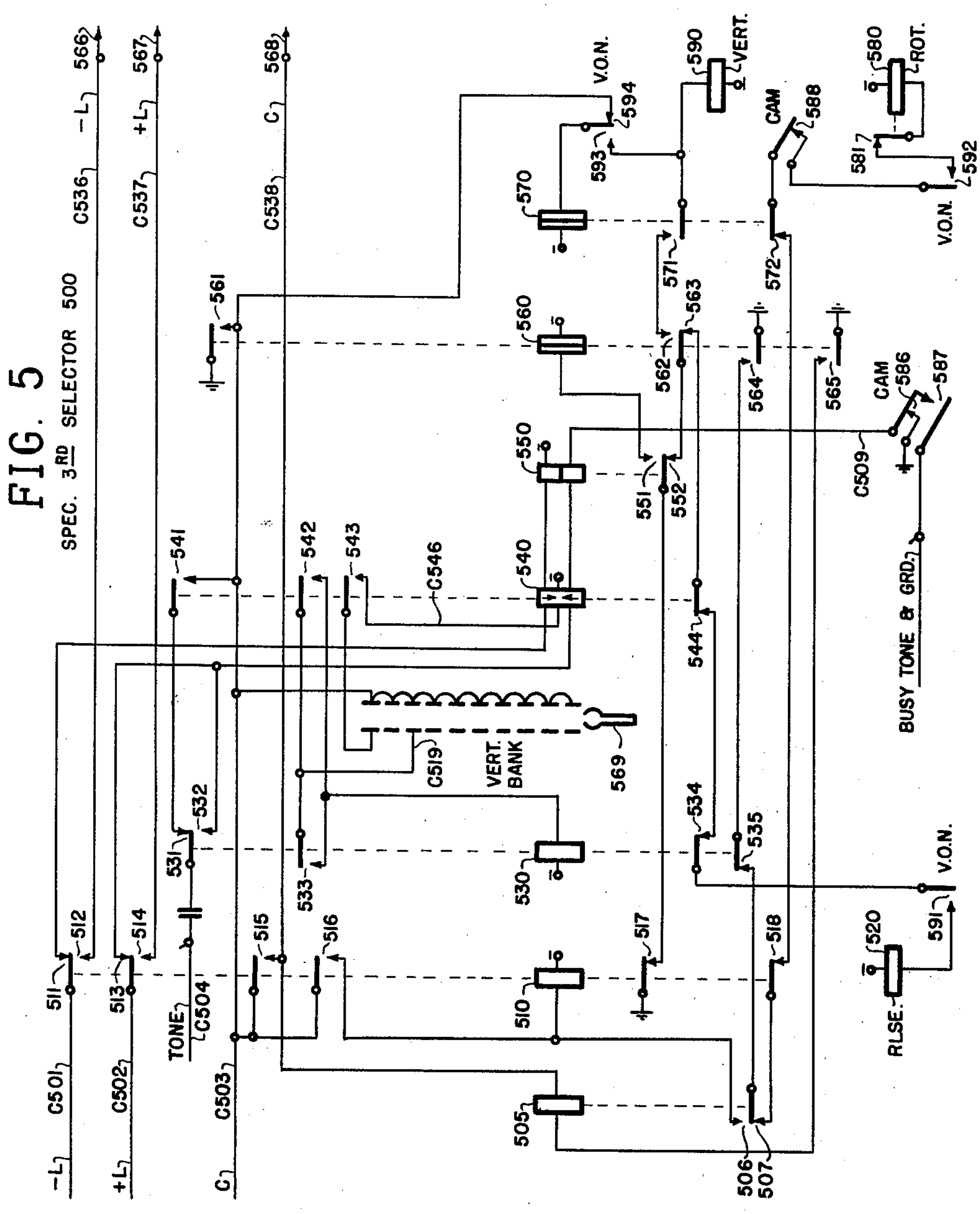
Fig. 5 shows a special third selector circuit arranged for restricted service.

Special second and third selectors 400 and 500 respectively are also shown in Fig. 2 and these two selectors will be more fully disclosed with reference to Figs. 4 and 5 respectively in the ensuing description. Special second selector 400 has access over its first level to the special third selectors such as 500, and over its tenth level to outgoing repeaters, such as 208, terminating a trunk to the third exchange C. The switching components in exchange C are not shown in Fig. 2, but may be of a type similar to those used in exchange A or B. The special third selector 500 has access over its eighth level to an outgoing repeater 205 terminating an inter-office trunk which at its other end is terminated by incoming selector 105 (Fig. 1). Both repeaters 205 and 208 may be of conventional design. From the tenth level on the special third selector 500 access is had to a CLR trunk circuit 209, which terminates a trunk connected at the other end to an operator's switchboard 212. Regarding the circuit design of this type of CLR trunk reference is made to Fig. 5 of my copending patent application Serial No.

215,561, filed March 14, 1951, now Patent No. 2,733,-295, issued January 31, 1956.

Referring again to special second selector 400, this selector contains a differential relay in series with its line relay. Calls over levels such as 1 of this selector proceed in the conventional way. However, on calls to level 10 the differential relay, responding to ground transmitted from the special dial of restricted stations, acts to prevent such stations from gaining access to this particular level. Special third selector 500 operates in a similar manner with respect to its eighth or inter-office level. On the other hand, if this selector is positioned on its tenth or toll level in a call from a restricted subscriber, the selector hunts for and connects up with an idle trunk circuit, such as 209, as in the case of a call from a non-restricted subscriber, except that it forwards a denial tone to the operator.

By way of summary, non-restricted substation T2 having a conventional type telephone dial has access to local substations and to substations in exchanges B and C. Restricted substation T1 having the special dial has access to local substations and substations in exchange B, but is restricted from making calls to substations in exchange C and is identified to the operator as a restricted station on calls to the toll board in B. Restricted substation T3 having the special dial has access to local substations within exchange B, but is restricted from making calls to exchange A or C, and on calls to the toll board is identified to the operator as a restricted station. Substation T4 being of conventional design, has access to local stations and stations in exchanges A and C, and may freely place toll calls. Providing that substation T5 is of conventional design, it has the same public office service as is rendered to substation T4.

*Outgoing calls from exchange A—calling station is non-restricted*

Assuming that a substation, such as T2, desires to communicate with a party at substation T4 in exchange B, the calling party will initially remove the receiver to close the hook switch contacts 20 (Fig. 1). The resulting closure of the line loop via conductors C113 and C114 will therefore operate the line circuit 101 which in turn, by means of an allotter (not shown) will cause a finder, such as 102, to search for and connect with the calling party in the manner well-known in the art. Finder 102 is linked with selector 103 which sends dial tone back to the calling party in a well-known manner.

Figure 3:
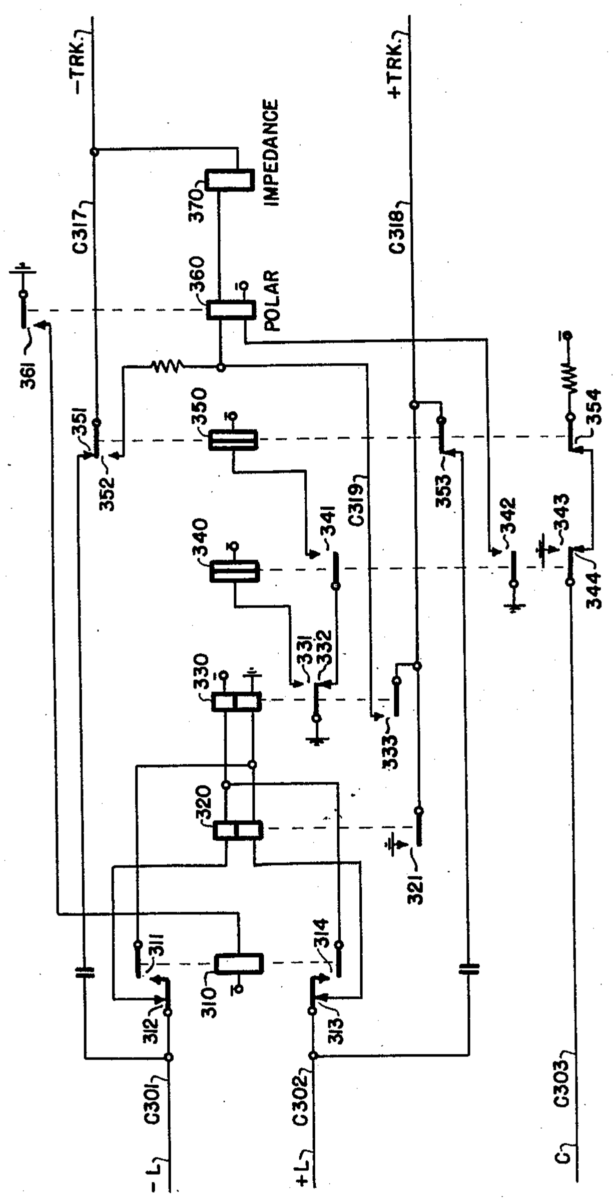
Fig. 3 shows a repeater circuit for use in conjunction with switches arranged for restricted service.

The dialing of the digit "0," as the first digit, will open and close the impulse spring contacts 21 ten times to send ten impulses in a well-known manner and operate the selector 103 to its tenth level, thus causing this selector to search for and seize an idle repeater, such as 300 connected to this level. Repeater 300, Fig. 3, is marked as idle to selector 103 by resistance battery connected to test conductor C303 via contacts 354 and 344. A loop circuit is now completed for operating the pulsing relay 330 (Fig. 3); the circuit extending from the closed line loop extended through line circuit 101, finder 102 and selector 103, on the one hand by way of negative conductor C301, contacts 312, upper winding of relays 320 and 330 to battery; and on the other hand by way of positive conductor C302, contacts 313, lower windings of relays 320 and 330 to ground. The relay 320 being a differential relay will not operate in this loop circuit. The operation of relay 330 closes contacts 331 to complete an obvious operating circuit for relay 340. Contacts 333 close to complete a circuit extending from conductor C317 over impedance 370, the upper winding of polar relay 360, contacts 333, conductor C318 of the inter-office trunk to incoming selector 206 in exchange B. The operation of relay 340 at contacts 341 prepares a circuit for the operation of relay 350. At contacts 342 an obvious circuit is completed through the lower winding of polar relay 360, however relay 360 will not operate with two windings energized in an opposing sense. At contacts 343, ground is placed on the C conductor C303 to hold the preceding equipment in a well-known manner.

Closure of the above trunk loop circuit prepares the selector 206 for the receipt of further dialled impulses in a well-known manner. Assuming the next digit dialled is the digit 0, the pulsing relay 330 intermittently releases during the dialling of the impulses and thereby intermittently opens and closes contacts 331, 332 and 333. The relay 340 being slow-to-release remains operated during intermittent openings of contacts 331. During each closing of contacts 332 a circuit is completed via contacts 341 for slow-to-release relay 350 which operates responsive to the first impulse and remains operated during the remainder of the impulse series. The operation of relay 350 at contacts 351 and 353 disconnects the condenser bridge from the trunk and at contacts 352 places a shunt across impedance 370 and the upper winding of relay 360 to improve pulsing conditions. The repeated impulses through contacts 333 will thereby operate the incoming selector 206 to its tenth level in a well-known manner and cause this switch to search for an idle local connector, such as 211, in this level. Upon completion of the series of dial pulses, relay 350 will release and will then similarly reoperate incident to the transmission of the next two series of dialled impulses in response to which, connector 211 in exchange B is set on the called subscriber's line terminals in a manner well-known in the art. The called party, such as T4 is then rung from this connector in the well-known manner.

Upon the called party T4 answering the call, the usual reversal in polarity will take place in the connector to operate polar relay 360 of repeater 300. The operation of relay 360 at contacts 361 completes an obvious circuit for operating relay 310. The operation of relay 310 at contacts 311, 312 and 314, 313 reverses the polarity on incoming line conductors C301, C302, for purposes not further illustrated, at the same time removing differential relay 320 from the line circuit. A talking circuit now exists to the called party T4, this talking circuit including in repeater 300 from the calling substation T2, conductors C301, C302 the two condensers shown in Fig. 3, contacts 351, 353 and conductors C317, C318. At the end of the conversation when the calling subscriber replaces his handset, relay 330 releases to thereby permit relays 340, 360 and 310 also to restore. The opening of the outgoing loop at contacts 333 permits the switching equipment in exchange B to restore and removal at contacts 343, of ground from test conductor C303 brings about the release of line circuit 101, finder 102 and selector 103 in the well-known manner.

Assuming that the substation T2 wishes to call a substation in exchange C, selector 103 may have seized the repeater 300 in the manner previously described, and upon the second digit being dialled (the digit 1), the repeater 300 will repeat the impulse to incoming selector 206 to move the associated wipers to the first level of this selector, thereby causing this switch to search for an idle special second selector in this level. Assuming the special second selector 400 is found idle due to battery, through the upper winding of relay 460 and contacts 482, being connected to test conductor C403 (Fig. 4), a loop circuit is completed for operating the pulsing relay 440; this circuit extending from the above-described loop placed on conductors C317, C318 in repeater 300 by way of incoming selector 206, Fig. 2, over conductors C401, C402, Fig. 4, contacts 421, 423, upper and lower windings of relays 430 and 440 to battery and through cam contacts 495 to ground respectively. The relay 430 being of the differential type will not operate in this loop circuit. The operation of relay 440 at contacts 441 completes an obvious circuit for operating the slow-to-release relay 450. At contacts 451, ground is placed on test conductor C403 by relay 450, whereby the incoming selector is held and relay 460 which operated upon seizure of selector 400 is maintained operated through its upper winding. At contacts 452 a circuit is prepared for energizing the vertical magnet 480 in parallel with the lower winding of relay 460, through contacts 461. At contacts 455 and 454 circuits are prepared for the operation of relays 410 and 420 respectively. At contacts 462 of relay 460 a circuit was opened for preventing the operation of the rotary magnet 490 at this time, and another point 461 is closed in the circuit of vertical magnet 480.

The dialling of the digit 0 opens and closes the contacts 441 and 442 of relay 440, intermittently ten times. Relay 450 will not release during intermittent openings of contacts 441 due to it being slow-to-release. The intermittent closing of contacts 442 will cause intermittent operation of the vertical magnet 480; the circuit extending from ground, through contacts 427, 442, 452, 461, winding of vertical magnet 480 to battery. Upon the receipt of the first impulse of the series, the vertical magnet will move the wipers 434, 435, and 436 up one step and operate the VON contacts, whereby contacts 481 and 483 will make and contacts 482 will break. The breaking of VON contacts 482 will open the circuit energizing relay 460 over its upper winding, however relay 460 being slow-to-release, will remain operated over its lower winding during the series of impulses. VON contacts 483 prepare a circuit for operating the rotary magnet 490, and VON contacts 481 prepare a circuit for the operation of the release magnet 470. The vertical magnet 480 receives the ten ground pulses from contacts 442 to move the wipers 434, 435 and 436 vertically to the tenth level of the banks of selector 400. The tenth level of selector 400 being a restricted level, normal post springs 488 will operate upon the wipers reaching this level, however the closing of these springs has no effect at this time. At the end of the series of impulses relays 440 and 450 are in operated condition but relay 460 will restore, thereby opening contacts 461 and closing contacts 462.

A circuit is now completed for operating the rotary magnet 490; the circuit extending from battery, winding of rotary magnet 490, contacts 491, 483, 497, 462, 428, 412, 454 to ground. Due to its self-interrupter contacts 491 the rotary magnet 490 will thereby rotate the wipers 434, 435 and 436 over the tenth level in search of an idle repeater containing battery on its C conductor. When an idle repeater, such as repeater 208, Fig. 2, is found idle, battery will be received therefrom over wiper 436 to operate relay 410; the circuit extending from the battery connection to the C conductor, not shown, of repeater 208, wiper 436, conductor C406, winding of relay 410, contacts 433, 455, to ground. The operation of relay 410 at contacts 412 opens the rotary magnet circuit, and at contacts 411 completes a circuit for operating relay 420; the circuit extending from battery, winding of relay 420, contacts 411, 454, to ground. The operation of relay 420 at contacts 426 provides a locking circuit for this relay extending to ground at contacts 451, and at the same time causes relay 410 to be short-circuited so that this relay restores; at contacts 421, 423 permits relay 440 to release; and at contacts 422, 424 extends the loop to repeater 208. At contacts 425 the C conductor C403 is now connected to conductor C406 and to the C conductor of repeater 208 so that ground returned over this conductor upon seizure of the repeater in the well-known manner causes an alternative locking circuit to be completed for relay 420 and incoming selector 206, Fig. 2, to be held from the repeater. The last-mentioned locking circuit extends from battery, through the winding of relay 420, contacts 426, 425, conductor C406, wiper 436 to ground on the C conductor of repeater 208. At contacts 428, another point is opened in the circuit of rotary magnet 490; and at contacts 427 the circuit of relay 450 is opened, whereby this relay is caused to restore with a certain delay. The repeater 208 will then receive the next series of impulses and repeat them to an incoming selector, not shown, in exchange C. The further extension of the connection in exchange C may take place in accordance with conventional principles and, therefore, requires no detailed explanation.

Had no idle repeater been found during rotation of the wipers of selector 400, the wipers would have rotated to the overflow or eleventh rotary position, thereby operating the cam springs which breaks contacts 495 and 497 and makes contacts 496. The opening of cam contacts 495 would open the loop circuit including relay 440, however at contacts 496 the loop circuit extending through this relay is maintained by way of busy tone and ground. The opening of cam contacts 497 opens the self-interrupter circuit of rotary magnet 490, thereby preventing further rotary stepping. The busy tone is sent back to the calling party over contacts 496, windings of relays 440, 430, contacts 423, positive line conductor C402, to the calling substation T2, notifying him of the busy condition.

Upon the calling party noticing the busy tone, he will replace the receiver upon the switch hook, thereby opening contacts 20 and the calling loop circuit. The opening of the calling loop brings about the release of repeater 300 in the manner described above. The release of repeater 300 permits the switching equipment in exchange A to restore and also causes the release of pulsing relay 440, Fig. 4, which accordingly opens its contacts 441 to restore relay 450. The restoration of relay 450 at contacts 451 removes ground from conductor C403, thereby permitting selector 206 to restore; and at contacts 453 completes a circuit for operating the release magnet 470; the circuit extending from battery, winding of release magnet 470, contacts 481, 432, 453, 442, 427, to ground. The operation of the release magnet 470 restores the wipers to their normal position which will open the VON contacts 481 to restore the release magnet 470. Upon closure of VON contacts 482 selector 400 is available again for use in future calls.

Assuming that the substation T2 desires to make a toll call via switchboard 212 the special second selector 400 will be seized responsive to the dialling of the initial two digits 01 in the manner previously described. However, in the present case the third digit dialled is "1," whereby the wipers 434, 435, and 436 of selector 400 are raised to the first level giving access, by way of conductors C501, C502 and C503, to special third selector 500 assuming selector 500 has been found idle incident to the trunk-hunting operation of selector 400 over this level. A loop circuit will then exist for operating relay 550; the circuit extending from battery, upper windings of relays 550, 540, contacts 511, negative line conductor C501, the loop from repeater 300 as extended over contacts 422, 424, conductors C404, C405 and wipers 434, 435 of selector 400, positive line conductor C502, contacts 513, lower windings of relays 540, 550, conductor C509, and contacts 586, to ground. Relay 540 being of the differential type will not operate in this loop circuit. The operation of relay 550 at contacts 551 completes an obvious circuit for energizing relay 560. The operation of relay 560 at contacts 561 places ground on test conductor C503 to hold selectors 400 and 206 as well as relay 570, this relay having previously operated upon seizure of selector 500. At contacts 562 and 571 two points are closed in the circuit of vertical magnet 590. At contacts 565 a circuit is prepared for operating relay 505; and at contacts 564 a point is closed in the circuit of rotary magnet 580 but at contacts 572 of relay 570 another point in this circuit is held open.

The dialling of "0" as the fourth digit will intermittently close and open contacts 552 of relay 550, whereby the following circuit is intermittently closed to vertical magnet 590; battery, magnet 590, contacts 571, 562, 552, 517, and ground. Slow-releasing relay 560 is held via contacts 551 throughout the impulse series. Upon the first dialled impulse of the series, the wipers 566, 567, 568, and 569 will vertically move one step and the VON springs will operate, whereby contacts 591, 592 and 593 make while contacts 594 break. At contacts 591 a circuit is prepared for the release magnet 520. Contacts 592 close another point in the circuit of rotary magnet 580. Contacts 594 disconnect the original circuit path for the energization of relay 570, however over contacts 593 relay 570, being slow-to-release, is held operated in parallel with vertical magnet 590 during pulsing. The vertical magnet will thereby step the wipers 566, 567, 568 and 569 to the tenth level upon receipt of the ten pulses. At the end of the impulse series wipers 566—569 have been positioned opposite the tenth level of the switch and relay 570 restores, disconnecting the vertical magnet 590 at contacts 571. The release of relay 570 at contacts 572 completes a circuit for the operation of the rotary magnet 580; the circuit extending from battery, through the winding of rotary magnet 580, contacts 581, 592, 588, 572, 518, 507, 535, 564, to ground. The rotary magnet 580 will open and close contacts 581 to rotate the wipers 566, 567, 568 and 569 over the bank contacts of the tenth level in search of battery on the C conductor of an idle CLR trunk circuit. Assuming that an idle trunk circuit, such as 209 is found, the battery on its C conductor will operate relay 505; the circuit extending from battery on this conductor via wiper 568, conductor C538, winding of relay 505, contacts 565, to ground. The operation of relay 505 at contacts 507 opens the rotary magnet circuit to prevent further rotary motion; and at contacts 506 completes a circuit for operating relay 510. The last-mentioned circuit may be traced from battery, through the winding of relay 510, contacts 506, 535, 564, to ground. The operation of relay 510 at contacts 512 and 514 extends the loop from repeater 300 by way of conductors C536, C537 and wipers 566, 567 to the line conductors, not shown, in CLR trunk circuit 209. At contacts 516, relay 510 locks to ground at contacts 561, and short-circuits relay 505 to initiate the release of this relay; and at contacts 515 the C conductor C503 is connected to conductor C538 and then to the C conductor, not shown, of CLR trunk circuit 209 via wiper 568. Incident to the seizure of the CLR trunk circuit, ground is returned over the C conductor thereat whereby at contacts 515 a circuit is completed for holding relay 510 and the switching relays in the preceding selectors in exchange B operated. At contacts 511, 512 the circuit of relay 550 is opened permitting this relay to release, and with contacts 517 and 551 open relay 560 also restores. The CLR trunk circuit will then extend the connection to an operator at switchboard 212, reference being made to Fig. 5 of my above-mentioned copending application for details of operation.

Had no idle trunk been found during rotation of the wipers of special third selector 500, the wipers would rotate to the eleventh rotary or overflow positon, thereby operating the cam springs causing contacts 586 and 588 to break and contacts 587 to make. The breaking of contacts 586 would open the original loop circuit including relay 550, however at contacts 587 busy tone and ground from conductor C548 is applied to maintain this relay operated. Busy tone is returned to the calling party via contacts 587, conductor C509, lower windings of relays 550 and 540, contacts 513, and positive line conductor C502.

Upon the calling party at substation T2 noticing the busy tone, he replaces the receiver on the cradle thereby breaking the switch hook contacts 20 and the calling loop to thereby restore repeater 300 which in turn, causes the release of the switching equipment in exchange A and the restoration of relay 550. This relay in releasing opens contacts 551 to release relay 560. The deenergization of relay 560 at contacts 561 removes ground from conductor C503 to permit selectors 206 and 400 to release and at contacts 563 completes a circuit for operating the release magnet 520; the circuit extending from battery, through the winding of release magnet 520, contacts 591, 534, 544, 563, 552, 517, to ground. The release magnet 520 operates to restore the wipers to their normal positions, thereby opening the VON springs. More particularly, at contacts 591 the circuit of release magnet 520 is opened and at contacts 594 battery is reclosed to conductors C503 thereby rendering selector 500 available for use in future calls.

*Outgoing calls from exchange A—calling station is restricted*

Assuming that a restricted substation, such as T1 (Fig. 1) containing the special type dial, desires to communicate with the party at substation T4 in exchange B, the calling party will initially remove the receiver. The resulting closure of the line loop will operate line circuit 100 over conductors C110 and C111 (Fig. 1), which in turn causes a finder, such as 102, to search for the calling party. Selector 103 which is linked up with finder 102 sends dial tone back to the calling party in the well-known manner.

Assuming that the first digit dialled is the digit 0, selector 103 will receive the ten impulses and operate its wipers to the tenth level. It will be recalled that the special dial at substation T1 sends a ground pulse immediately after completion of each digit dialled. However, since selector 103 is of conventional design this ground pulse will have no effect on selector 103 other than holding its line relay (not shown) operated over its battery-connected winding for the duration of the pulse. At the end of the digit the switch wipers will thus rotate over the selected level in the usual manner in search of an idle outgoing repeater. Assuming that repeater 300 is seized, then selector 103 in switching through extends the loop to relays 320 and 330 in this repeater. Differential relay 320 does not operate over the loop. Relay 330 in operating in turn operates relay 340 as previously described. At contacts 333 relay 330 closes the trunk loop to prepare incoming selector 206 for the receipt of the next series of impulses as repeated by repeater 300.

The next dialled digit being the digit "0," relay 330 will restore and reoperate ten times. Closure of contacts 332 on the first release of relay 330 operates slow-to-release relay 350 to improve pulsing conditions. The intermittent opening of the trunk loop at contacts 333 causes the wipers of incoming selector 206 to be raised to the tenth level. The ground pulse transmitted from the special dial after the completion of this second digit causes the momentary operation of differential relay 320. Selector 206 being of conventional design the corresponding momentary grounding at contacts 321 of the trunk conductors again has no effect on selector 206. At the end of the digit, selector 206 will therefore rotate its wipers in search of an idle connector, such as 211, in the usual manner, and this connector will then receive the final two series of impulses to complete the connection to substation T4 as described above. Since connector 211 also is of standard design the ground pulse repeated by repeater 300 at the end of each of these final digits will have no effect on this connector either.

Assuming that the restricted substation T1 attempts to make a call to exchange C, the calling party by dialling "0" as the first digit will seize repeater 300 and incoming selector 206 as described above to set up the selector. The second digit dialled in the present case being the digit "1," the wipers of selector 206 will be raised to its first level. The ground pulse received by differential relay 320 at the end of this digit and repeated at contacts 321 will have no effect on this selector, that is selector 206 will now in the usual manner search for and seize an idle special selector, such as selector 400 connected to this level. Upon extension of the loop circuit by selector 206, relay 440 will operate over a previously traced circuit, and the operation thereof will operate relay 450. Access to exchange C being over the tenth level of the banks of the special second selector 400, the calling party will dial "0" as the third digit. The dialling thereof will intermittently close and open contacts 442 to operate magnet 480 intermittently to thereby move the wipers 434, 435, and 436 to the tenth level. The tenth level being a restricted level, normal post spring 488 will close when the switch wipers are raised to this level. Upon the end of this third series of impulses, the ground pulse from the special dial (as repeated by relay 320, Fig. 3,) will momentarily operate differential relay 430. Relay 430, in operating, at contacts 431 will lock itself operated; the circuit extending from battery, through the winding of relay 430, contacts 431, 488, 451 to ground. At contacts 432 a point in the circuit of release magnet 470 is opened and at contacts 433 the circuit of test relay 410 is held opened. Consequently, when changeover relay 460 in releasing after a certain delay, at contacts 462 completes the above-traced circuit of rotary magnet 490, the self-interrupting action of the magnet will cause the switch wipers to be rotated all the way to their eleventh rotary position regardless of whether or not battery from an idle outgoing repeater is encountered by test wiper 436 during this rotary stepping action due to the fact that relay 410 cannot be operated. The rotation of the wipers to their eleventh rotary position will operate the cam springs whereby contacts 495 and 497 will open and 496 will close. At contacts 497 further operation of the rotary magnet is prevented. The opening of contacts 495 will open the original loop circuit through relay 440, however at contacts 496 busy tone and ground is applied maintaining relay 440 operated. This busy tone reminds the calling party that he is restricted from calling exchange C.

Upon receiving the busy tone, the calling party will replace the handset on the cradle thereby breaking the loop circuit and restoring the switching equipment to normal in a manner previously described.

Assuming that the party at substation T1 attempts to make a toll call, the special second selector 400 will be seized in the manner previously described upon dialling digits "0" and "1." In the present instance the third digit dialled is "1," whereby selector 400 will move its wipers to level one. The first level being non-restricted, normal post springs 488 will not operate when the wipers are positioned on this level. Thus, while the ground pulse repeated by relay 320 at the end of the third digit again will operate differential relay 430, this relay will release at the end of the pulse, its locking circuit not being prepared in the instant case. Therefore, upon release of relay 460, rotary magnet 490 will proceed to rotate the wipers 434, 435 and 436 in search of an idle special third selector in the manner explained above for a call from non-restricted station T2. Upon the wipers finding an idle selector, such as 500, a circuit is completed for operating relay 410 of selector 400; the circuit extending from battery through winding of relay 570 (Fig. 5), contacts 594, C conductor C503, wiper 436 (Fig. 4), conductor C406, winding of relay 410, contacts 433, 455 to ground. The special second selector 400 will then switch the connection through in a manner previously disclosed, whereby the next series of impulses will operate special third selector 500 in the manner described above. Relays 550, 560, and 570 are now operated over the circuits previously traced.

Upon the receipt of the next or fourth series of impulses (digit "0"), contacts 552 will intermittently close and open ten times sending a corresponding number of impulses to vertical magnet 590 over the circuit traced above. Vertical magnet 590 will then proceed to step wipers 566, 567, 568 and 569 to the tenth level. Upon the wipers moving up one step, the VON springs will operate closing contacts 591, 592 and 593 while opening contacts 594. The closing of contacts 591 prepares a circuit for energizing the release magnet 520. Contacts 592 prepare a circuit for energizing the rotary magnet 580. At contacts 594 the initial energizing path for relay 570 is broken, however at contacts 593 relay 570 is maintained operated due to its slow-to-release characteristics thoughout the impulse series.

At the end of the series of impulses a ground pulse from the special dial at substation T1 is repeated by relay 320, Fig. 3, so that differential relay 540 operates, viz. from ground at contacts 321 via contacts 333, 352, the negative leg of the line including conductor C317, C401, contacts 422, conductor C404, wiper 434, conductor C501, contacts 511, upper winding of relays 540 and 550 to battery. Differential relay 540 in operating connects denial tone from contacts 531 to test conductor C503, thereby preparing the connection of this tone to test wiper 568; at contacts 544 opens a point in the circuit of release magnet 520; and at contacts 542 closes a point in the circuit of relay 530, however without effect in the present type of call. At contacts 543 relay 540 completes a locking circuit for maintaining itself operated; the circuit extending from battery through the center winding of relay 540, contacts 543, vertical bank contacts engaged by vertical wipers 569 in the tenth vertical position of the switch, to ground on test conductor C503. Wipers 569 are of the type which throughout the rotary motion of the switch remains in engagement with the vertical bank contacts reached at the end of the vertical motion.

Subsequent to the operation of relay 540 in response to the ground pulse, relay 570 will restore as no further dial pulses are received. The release of relay 570 at contacts 572 completes the above-traced circuit for operating rotary magnet 580, whereby wipers 566—568 are rotated in search of an idle CLR trunk. Upon the wipers finding an idle CLR trunk circuit, such as 209, a circuit is completed for operating relay 505; the circuit extending from battery on the C conductor, not shown, of CLR trunk circuit 209, wiper 568, conductor C538, winding of relay 505, contacts 565, to ground. Relay 505 in operating at contacts 507 prevents further rotary motion; at contacts 506 completes the above-traced circuit for energizing relay 510; at contacts 512 and 514 extends the loop circuit to the CLR trunk circuit 209; at contacts 516 locks itself operated; at contacts 511, 513 permits relay 550 and hence relays 560 and 505 to restore; and at contacts 515 switches test conductor C503 through to test wiper 568, whereby denial tone is placed on the test conductor, not shown, of CLR trunk circuit 209, viz. by way of the following circuit: conductor C504, tone condenser, contacts 531, 541, 515, conductor C538, test wiper 568, test conductor of CLR trunk circuit 209.

As will be clear from the disclosure of my above-mentioned copending application Serial No. 215,561 this test conductor is terminated, upon operation of the hold relay in the CLR trunk circuit, Figure 5 of that application, by ground through the low-resistance primary winding of an induction coil. When the operator at switchboard 212, Fig. 2, answers the call the secondary winding of this induction coil is connected momentarily to the line conductors of the trunk circuit so that the operator will hear the denial tone in her telephone instrument. The operator will accordingly notify the calling subscriber that he is restricted from making toll calls or she will otherwise deal with the matter as circumstances may require. After the calling party and the operator have disconnected, the switching equipment will be restored to normal as described.

*Outgoing calls from exchange B—calling station is non-restricted*

Assuming that non-restricted substation T4 (Fig. 2) desires to communicate with a party in exchange C, the calling party will initially remove the receiver to complete a loop circuit to line circuit 203 which in turn, by means of an allotter (not shown) will cause a finder, such as 204, to search for the calling party in the manner well-known in the art. Finder 204 is linked with selector 207 which sends dial tone back to the calling party in a well-known manner. The dialing of the digit "1" will open and close the associated impulse spring one time to step the selector to its first level thereby causing this selector to search for, and extend the connection to a special second selector, such as 400. Responsive to the dialling of "0" as the second digit special second selector 400 will now operate in the manner described above in connection with a cell from station T2, Fig. 1, i.e. the wipers of selector 400 will be raised to the tenth level and then rotated in search of an idle outgoing repeater, such as 208. The operation of this repeater also is identical to that described above.

If the subscriber at substation T4 wishes to call the toll operator at switchboard 212 he dials 110. The connection in this case extends via the first level of a local selector such as 207, the first level of a special second selector, such as 400, and the tenth level of a special third selector, such as 500. The operation of selectors 400 and 500 in this type of call is similar to the operation of these selectors as described above for a toll call from substation T2.

Assuming that the party at substation T4 desires to call substation T2 in exchange A, the dialling of "1" as the first and second digit will cause a special second selector, such 400, and a special third selector, such as 500 to be seized as previously described, providing these selectors are idle.

Upon seizure of selector 500 relays 550, 560, 570 operate as previously described. Upon the dialling of "8" as the third digit wipers 566, 567, 568, and 569 will be vertically stepped to the eighth level of the switch. Upon release of relay 570 at the end of the digit, wipers 566—568 will then rotate in search of an idle outgoing repeater, such as 205. Upon seizure of repeater 205, a circuit is completed for operating relay 505 from battery over the C conductor, not shown, of repeater 205, wiper 568, conductor C538, winding of relay 505, contacts 565 to ground. The operation of relay 505 at contacts 507 arrests the switch wipers and at 506 completes a circuit for operating relay 510. The operation of relay 510 among other results previously described, at contacts 512, 514, and 515 extends the loop circuit for allowing the next or fourth series of impulses dialled to be received by repeater 205. Repeater 205 is connected over the interoffice trunk to incoming selector 105 in exchange A, whereby the next series of impulses will be repeated by repeater 205 to operate the wipers in selector 105 to the level corresponding to the fourth digit dialled. Assuming this fourth digit is the digit "1," the wipers of selector 105 will be raised to the first level and then rotated in search of an idle connector, such as 104. Upon receipt of the final two digits of the called subscriber's number the wipers of connector 104 will be positioned on the set of bank contacts corresponding to substation T2 in the well-known manner. If the called party's line is idle as indicated by battery encountered on test conductor C115, ringing current will be applied to this line to notify the party at substation T2 of the incoming call. The called party will then proceed to remove the handset to cut off the ringing in the well-known manner, and conversation with the calling party at T4 may then begin. Upon termination of the call, when the calling party replaces the handset the release of repeater 205 permits the switching equipment in both offices to restore, the release of special second selector 400 and special third selector 500 taking place in the manner previously described.

*Outgoing calls from exchange B—calling station is restricted*

Assuming that the restricted substation T3 attempts to call a party in exchange C, the dialling of "1" as the first digit will operate selector 207 to its first level giving access to a special second selector, such as 400; the ground pulse transmitted from the special dial at this substation at the end of the digit will have no effect. However, the ground pulse thus received by selector 400 at the end of the next digit "0" which raises the wipers of this switch to the tenth level, will cause differential relay 430 to operate and lock, whereby selector 400 is forced into its overflow position and busy tone returned from this position in the manner previously described, notifying the calling party that he is denied access to this level.

Upon the party at the restricted substation T3 attempting to make a toll call via CLR trunk circuit 209, differential relay 540 in selector 500 is operated and locked in response to the ground pulse transmitted from the special dial at T3 at the end of the third digit "0." As described above for a toll call from restricted substation T1, Fig. 1, operation of differential relay 540 causes a denial tone to be forwarded to the operator at switchboard 212.

Assuming the party at the restricted substation T3 attempts to call a substation, for example T1, at exchange A, the dialling of the first digit "1" operates selector 207 to the level accommodating the trunks to the special second selectors, such as 400. Upon again dialling "1" as the next digit the wipers of selector 400 are positioned on the first level of the switch giving access to the special third selectors, such as 500. The ground pulse transmitted from the special dial at the end of the first digit "1" has no effect on selector 207. The ground pulse similarly sent at the end of the second digit "1" does operate differential relay 430 in selector 400, but since no locking circuit is prepared for relay 430 on the first level of this switch, the relay releases at the end of the ground pulse before relay 460 on restoring initiates automatic rotary action. Thus trunk hunting over this level takes place as usual and a connection is completed to special third slector 500, providing this selector has been found idle.

Upon seizure of special third selector 500 relays 550, 560, 570 operate with the results described above. The dialling of "8" as the third digit will pulse relay 550 which intermittently opens and closes contacts 552 to operate the vertical magnet 590 eight times, and thus move the wipers of this switch to the eighth level providing access to repeaters, such as 205, all as previously described. However, at the end of this series of impulses, a ground pulse will be sent from the special dial in the manner disclosed to operate differential relay 540 over its upper winding. Upon operation, relay 540 closes contacts 541 and 543 but this has no effect in the present instance. At contacts 542 a circuit is completed for operating relay 530, this circuit extending from battery through the winding of relay 530, contacts 542, conductor C519, vertical wiper 569 in its eighth position to grounded conductor C503. At the end of the ground pulse, differential relay 540 will restore, but relay 530 locks over its contacts 533 independently of contacts 542 of relay 540. The operation of relay 530 at contacts 532 completes a circuit for sending a tone back to the calling party, this circuit extending from conductor C504, by way of contacts 532, 513, positive conductor C502, wiper 435 (Fig. 4), conductor C405, contacts 424, conductor C402, selector 207, finder 204, line circuit 203, and back to the calling party. At contacts 534, relay 530 opens a point in the circuit of release magnet 520, and at contacts 535 a point is opened in the circuit of rotary magnet 580, thereby preventing the rotation of the switch wipers incident to the release of relay 570.

Upon the calling party at substation T3 receiving the tone indicating that he is barred from access to the level dialled, he will replace his receiver thereby opening the loop circuit. The opening of the loop circuit at special third selector 500 will restore relay 550. The restoration of relay 550 at contacts 551 opens the circuit of relay 560, and at contacts 552 prepares a circuit for the operation of the release magnet 520. The relay 560 restores and at contacts 561 removes ground to permit relay 530 and also the preceding switches to restore. At contacts 563 another point is closed in the circuit of release magnet 520. The opening of contacts 564 prevents the operation of the rotary magnet, and the opening of contacts 565 removes the ground from test wiper 568. Relay 530 in restoring at contacts 532 disconnects tone from the positive line conductor. At contacts 533 another point is opened in the locking circuit for relay 530 and at contacts 534 the following circuit is completed for operating the release magnet 520: battery, winding of magnet 520, contacts 591, 534, 544, 563, 552, 517, ground. The operation of release magnet 520 will restore wipers 566, 567, 568, and 569 to normal, whereby the VON springs will restore to their normal positions. The opening of contacts 591 will deenergize the release magnet 520. At contacts 594 battery is reconnected to test conductor C503 to ready selector 500 for future seizure.

*Outgoing calls from exchange B—calling station is a P.A.B.X station*

Let it first be assumed that P.A.B.X substation T5 is a non-restricted station and hence is provided with a conventional type dial. If the P.A.B.X subscriber at this substation desires to make an outgoing call via the public exchange B, the removal of the handset T5 will cause line switch 201 (Fig. 2) to be operated over the closed loop circuit. Line switch 201, in turn, will seize an idle selector, such as 202, which will send dial tone back to the calling party. The calling party will then dial a first digit to position selector 202 on the level giving access to an idle outgoing repeater, such as 200, terminating a trunk to public office B. Upon seizure of repeater 200 relay 225 is operated therein via the closed calling loop and this relay, in turn, completes a loop circuit extending over the trunk to line circuit 210, in the manner described in my above-mentioned copending application. As a result, a line finder and selector, such as 204 and 207 respectively is taken into use in office B. The remaining operation of the equipment in exchange B on the various types of outgoing calls as originated by a nonrestricted P.A.B.X substation is the same as that described above for the corresponding outgoing calls from non-restricted substation T4, in exchange B itself, and need not be further described. At the end of the conversation, when the subscriber at T5 replaces his receiver the restoration of relay 225 permits the switching equipment both in the P.A.B.X and in the public network to release.

Should substation T5 be a restricted substation and therefore have a special type dial, the ground pulse transmitted from this dial at the end of the second and any subsequent digit dialled would operate differential relay 230 in repeater 200. As described in my above copending application the operation of relay 230 at the end of each of these digits acts to unbalance the public office trunk at contacts 231, whereby the ground pulse from the special dial is, in effect, repeated by this relay. The repetition by this relay of the ground pulse sent at the end of the second digit has no effect on selector 207. However, assuming that this selector is operated to its first level giving access to special second selectors, such as 400, and selector 400 is then positioned on its tenth level accommodating outgoing repeaters such as 208, differential relay 430 in this selector responds to the ground pulse repeated by relay 230 at the end of the third digit to bar the calling party from access to exchange C, as described above for a call from restricted substation T3. Similarly, if substation T5 having the special dial attempts to call a party in exchange A over the eighth level of selector 500 or make a toll call over the tenth level of selector 500, after having set selector 400 on its first level, differential relay 540 in selector 500 will operate to restrict these calls in the manner explained above for calls to exchange A and toll calls, respectively, as originated at substation T3.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. A telephone system, a first exchange and a second exchange, a trunk interconnecting said exchanges, a repeater terminating said trunk in said first exchange, restricted and non-restricted substations in said first exchange, a numerical switch in said second exchange having a plurality of wipers for extending connections, said non-restricted substations having a calling device of a first type provided with impulse contacts, said restricted substations having a calling device of a second type provided with impulse contacts and auxiliary contacts, a first line relay and a first differential relay in said repeater, a first loop circuit including said impulse contacts extending from a substation of either class to said two relays, a second line relay and a second differential relay in said switch, a second loop circuit extending from said repeater by way of said trunk to the last-mentioned two relays, said impulse contacts being intermittently opened during the return movement of the calling device at said substation following actuation of said device, said first line relay being responsive to the intermittent openings of said impulse contacts to repeat the digital impulses to said switch by way of said second loop circuit, said auxiliary contacts, in the case of a call from a restricted substation, being momentarily closed during said return movement but incoincidently with the opening of said impulse contacts to momentarily unbalaance said first loop circuit, said first differential relay being operated in response to said momentary unbalancing by the auxiliary contacts to momentarily unbalance said second loop circuit, said second line relay being responsive to the digital impulses repeated by said first line relay to selectively position said wipers, and means controlled by the operation of said second differential relay in response to said unbalancing of said second loop circuit for preventing the extension of the connection over said switch wipers.

2. A telephone system comprising a numerical switch having wipers and a plurality of groups of bank contacts, outgoing trunks connected to said bank contacts, a trunk incoming to said switch and including a pair of line conductors, restricted and non-restricted substations, means for extending connections from said substations to said switch over said line conductors, transmitting means in each substation for transmitting a series of numerical loop impulses over said conductors to said switch by a calling one of said substations, directive means in said switch controlled over said line conductor in response to said transmitted loop impulses to directively operate said wipers to select one of said group of bank contacts, selecting means in said switch automatically operated after the termination of said transmitted loop impulses for automatically operating said wipers over said selected group of bank contacts in search of an idle outgoing trunk in said selected group, a testing circuit in said switch for stopping said searching operation in response to said wipers reaching the bank contacts terminating an idle outgoing trunk in the selected group, in combination with means individual to said restricted substation transmitting means for transmitting a ground pulse to said switch over said line conductors immediately after the transmission of said loop impulses and before said automatic searching operation of said wipers, a differential relay connected to said line conductors in said switch and momentarily operated by said transmitted ground pulse, locking means for maintaining said differential relay in operated position after said directive movement of said wipers, and contacts operated by said differential relay for disabling said testing circuit during said automatic searching operation of said wipers to prevent said wipers stopping on an idle trunk while said differential relay is maintained operated.

3. A telephone system as claimed in claim 2, wherein at least one of said groups of bank contacts comprises a restricted group, means operative in response to the directive movement of said wipers to said restricted group for preparing said locking means, and means for completing said prepared locking means in response to the operation of said differential relay prior to the automatic searching operation of said wipers.

4. A telephone system comprising a numerical switch having wipers and a plurality of groups of bank contacts, outgoing trunks connected to said bank contacts, a trunk incoming to said switch and including a pair of line conductors, restricted and non-restricted substations, means for extending connections from said substations to said switch over said line conductors, transmitting means in each substation for transmitting a series of numerical loop impulses over said conductors to said switch by a calling one of said substations, directive means in said switch controlled over said line conductors in response to said transmitted loop impulses to directively operate said wipers to select one of said groups of bank contacts, in combination with a local operating circuit confined wholly within said switch and excluding said wipers automatically effective after said directive movement of said wipers for automatically advancing said wipers over said selected group of bank contacts in search of an idle outgoing trunk, a test circuit including a test relay in said switch operated responsive to said wipers reaching the bank contacts of an idle outgoing trunk in said selected group, contacts operated by said operated test relay for disabling said local operating circuit to stop further advance of said wipers to thereby select an idle outgoing trunk in said selected group, means individual to said restricted substation transmitting means for transmitting a ground pulse to said switch over said line conductors immediately after the transmission of said loop impulses, a differential relay connected to said line conductors in said switch and operated by said transmitted ground pulse from said restricted substation transmitting means, and means including other contacts operated by said operated differential relay for disabling said test circuit during the automatic advance of said wipers over said selected group of bank contacts to prevent the operation of said test relay and the stopping of said wipers on the bank contacts terminating an idle trunk in the selected group.

5. A telephone system as claimed in claim 4, including means for completing said local operating circuit a predetermined timed interval after termination of said transmitted loop impulses, and a locking circuit completed for locking said differential relay in operated position prior to the completion of said local operating circuit to maintain said differential relay operated during the automatic advance of said wipers to thereby disable said test circuit.

6. A telephone system as claimed in claim 4 wherein said ground pulse is terminated shortly after the termination of said transmitted loop impulses and prior to the completion of said local operating circuit, means for completing said local operating circuit a predetermined timed interval after termination of said transmitted ground and loop impulses, and a locking circuit completed for locking said differential relay in operated position prior to the termination of said ground pulse and prior to the completion of said local operating circuit.

7. A telephone system comprising a numerical switch having wipers and a plurality of levels of bank contacts, outgoing trunk lines terminating in said bank contacts, a trunk incoming to said switch and including a pair of line conductors, restricted and non-restricted substations, means for extending connections from said substations to said switch over said line conductor, transmitting means in each substation for transmitting a series of numerical loop impulses over said conductors to said switch by a calling one of said substations, directive means in said switch operated responsive to the receipt of said transmitted loop impulses for directively operating said wipers to select a level of said bank contacts, a local stepping circuit in said switch automatically effective after said directive movement for automatically stepping said wipers step-by-step over said selected level of bank contacts in search of an idle outgoing trunk line, a test circuit including a test relay in said switch operated responsive to said wipers reaching the bank contacts of an idle trunk line in said selected level, in combination with means individual to said restricted substation transmitting means for transmitting a ground pulse to said switch after the termination of said transmitted loop impulses, a differential relay in said switch operated by said transmitted ground pulse, control means in said switch effective only in case said wipers are directively operated to select a predetermined one of said levels of bank contacts, and means jointly controlled by said operated differential relay and said control means when rendered effective for preventing the selection of an idle trunk in said one predetermined selected level.

References Cited in the file of this patent

UNITED STATES PATENTS

| | | |
|---|---|---|
| 1,924,095 | Griffins | Aug. 29, 1933 |
| 2,214,213 | Voss | Sept. 10, 1940 |
| 2,366,647 | Ostline | Jan. 2, 1945 |
| 2,544,944 | Wicks | Mar. 13, 1951 |
| 2,592,784 | Bakker | Apr. 15, 1952 |
| 2,642,498 | Riddell et al. | June 16, 1953 |
| 2,707,727 | Pharis | May 3, 1955 |